(12) United States Patent
Owen et al.

(10) Patent No.: US 12,492,659 B2
(45) Date of Patent: Dec. 9, 2025

(54) TURBOCHARGER TURBINE HOUSING ASSEMBLY

(71) Applicant: Garrett Transportation I Inc., Torrance, CA (US)

(72) Inventors: Gareth Owen, Plymouth, MI (US); Dusan Racek, Brno (CZ); Ludek Pohorelsky, Brno (CZ); Miroslav Protiva, Brno (CZ); Pavel Bares, Brno (CZ); Martin Fajkus, Brno (CZ); Louis Worth, Plymouth, MI (US); Lenardo Burton, Plymouth, MI (US); Jan Blecha, Brno (CZ)

(73) Assignee: Garrett Transportation I Inc, Torrance, CA (US)

( * ) Notice: Subject to any disclaimer, the term of this patent is extended or adjusted under 35 U.S.C. 154(b) by 0 days.

(21) Appl. No.: 18/607,082

(22) Filed: Mar. 15, 2024

(65) Prior Publication Data

US 2025/0290440 A1  Sep. 18, 2025

(51) Int. Cl.
*F02B 37/16* (2006.01)
*F01D 17/10* (2006.01)
*F01D 25/24* (2006.01)
*F02B 37/18* (2006.01)

(52) U.S. Cl.
CPC ............ *F02B 37/16* (2013.01); *F01D 17/105* (2013.01); *F01D 25/24* (2013.01); *F02B 37/164* (2013.01); *F02B 37/18* (2013.01); *F02B 37/183* (2013.01); *F02B 37/186* (2013.01); *F05D 2220/40* (2013.01); *F05D 2240/128* (2013.01); *F05D 2260/606* (2013.01)

(58) Field of Classification Search
CPC ........ F01D 17/105; F01D 25/24; F02B 37/18; F02B 37/183; F02B 37/186; F05D 2220/40; F05D 2240/128; F05D 2260/606
See application file for complete search history.

(56) References Cited

U.S. PATENT DOCUMENTS

| 2012/0001104 A1* | 1/2012 | Shimada | F16K 31/047 251/65 |
| 2015/0121863 A1* | 5/2015 | Micanek | F02B 37/183 60/605.1 |
| 2022/0235694 A1* | 7/2022 | Zhang | F01N 3/101 |

FOREIGN PATENT DOCUMENTS

JP  H09-53457 A  *  2/1997 ............. F02B 37/18

* cited by examiner

*Primary Examiner* — Audrey B. Walter
(74) *Attorney, Agent, or Firm* — BelayIP

(57) ABSTRACT

A turbine housing assembly can include an inlet conduit portion that defines an inlet passage, where the inlet passage is in fluid communication with a cavity via an opening surrounded by a valve seat; a volute portion that defines a volute that is in fluid communication with the inlet passage and a turbine wheel space; a valve, where a shaft is rotatably supported by a bushing disposed in a bore and where, in a closed state of the valve, an arm is disposed in the cavity; and a controller operatively coupled to a control arm to transition the valve between the closed state and an open state, where, in the open state, a plug moves into the inlet passage to restrict flow between an inlet opening and a volute and to direct flow to the cavity, where the cavity is in fluid communication with a treatment unit.

19 Claims, 12 Drawing Sheets

TURBOCHARGER TURBINE HOUSING ASSEMBLY

TECHNICAL FIELD

Subject matter disclosed herein relates generally to turbocharger turbine housing assemblies for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

A turbine wheel can be positioned in a turbine housing where the turbine housing can include one or more volutes that are shaped and sized to direct flow of exhaust to the turbine wheel. For example, a turbine housing can include an inlet and an outlet where exhaust is directed from the inlet to one or more volutes to a turbine wheel space and then from the turbine wheel space to the outlet. Exhaust from the outlet may be directed to one or more components for exhaust treatment, which may include treatment as to one or more of chemical composition, heat content and noise.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
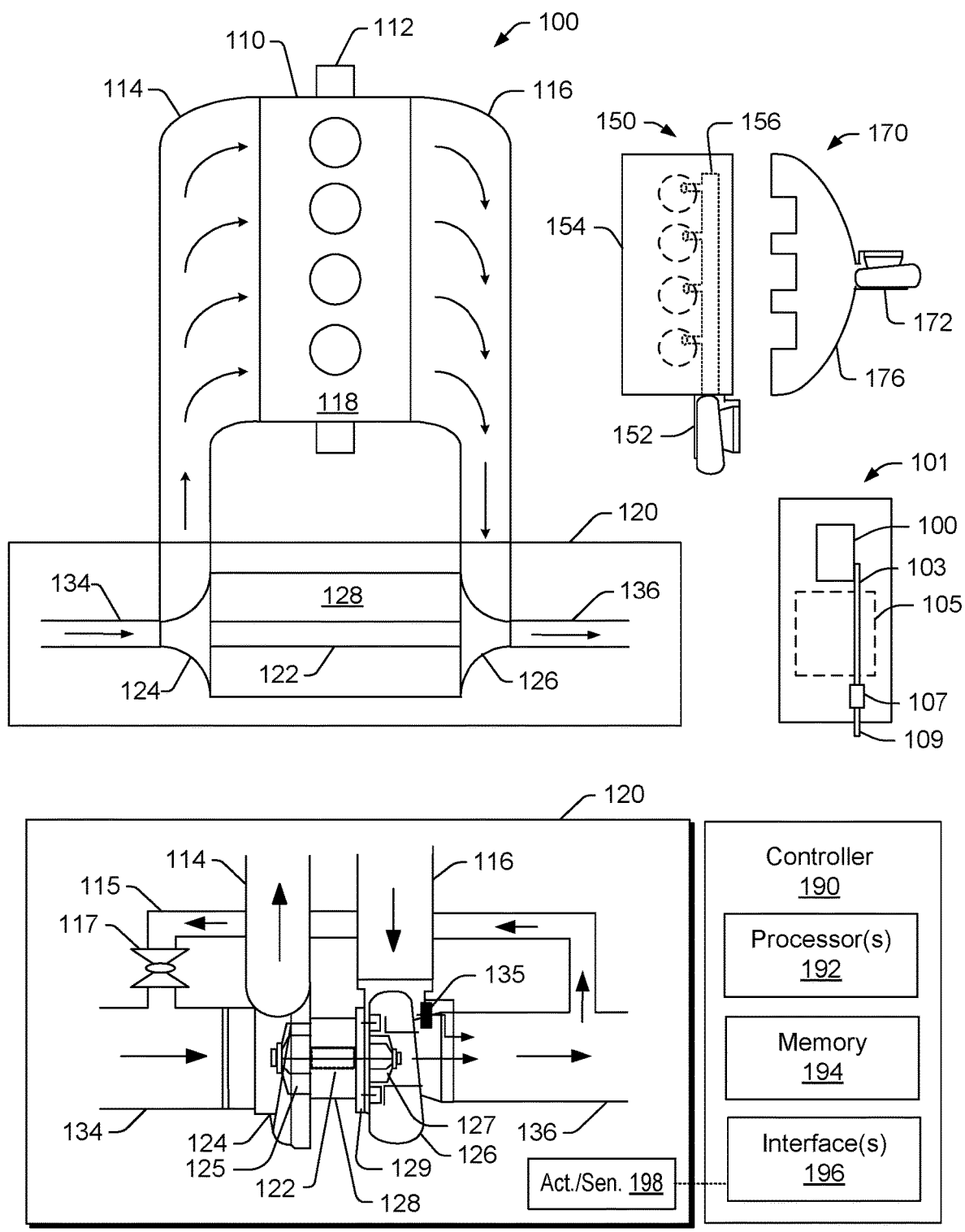
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.). As an example, a silencer such as a muffler may be included that aims to reduce sound emissions. As an example, a combined treatment unit and silencer may be utilized along an exhaust flow path or exhaust flow paths.

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In the turbocharger 120 of FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 (e.g., a variable nozzle turbine assembly) is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
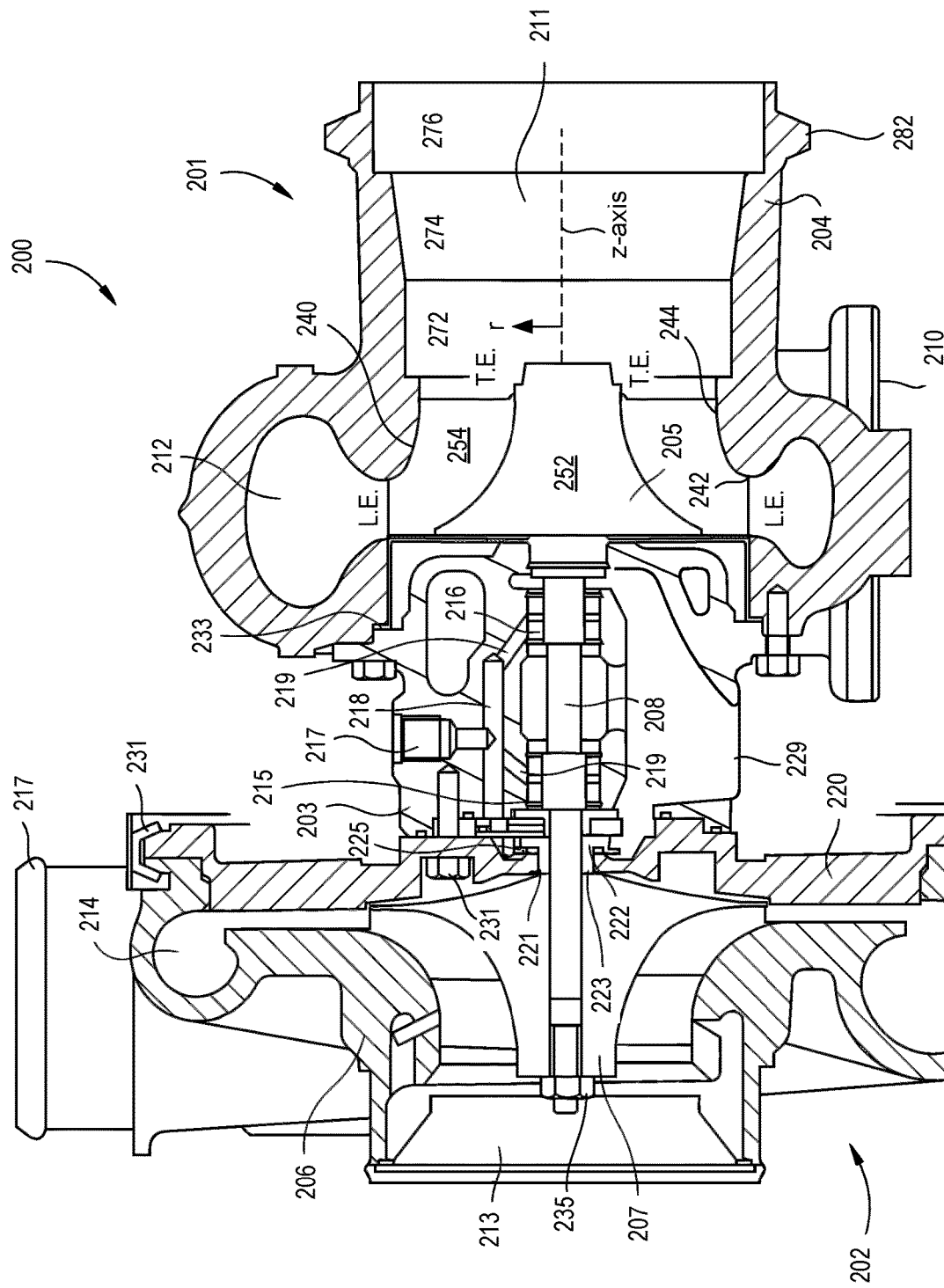
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of an Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 severs various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.). Also, as to temperature, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

As an example, a turbine housing assembly may include a valve and a diversion passage where the valve may be controlled to direct at least a portion of exhaust entering the turbine housing assembly to the diversion passage. In such an example, the diversion passage may be in fluid communication with a treatment unit, which may include one or more catalysts. In such an example, the one or more catalysts may operate more efficiently with respect to chemical conversions of constituents of exhaust where the one or more catalysts are heated to a sufficiently high temperature. As an example, in a cold-start scenario, for example, where an internal combustion engine may be at an ambient temperature that is below that of a suitable catalyst temperature, a valve may be controlled to divert a portion of exhaust to a treatment unit to elevate catalyst temperature. In such a scenario, the diversion of exhaust to facilitate heating of catalyst may occur in a low power demand period. For example, consider a truck with a trailer that is navigating congested city streets before getting onto an uncongested highway. During slow moving on the city streets, power demand may be low such that benefits of a turbocharger may be minimal. For example, exhaust directed to a turbine wheel of a turbocharger may not add substantially to power and/or efficiency. As such, an opportunity exists to divert exhaust to a treatment unit (e.g., or units) to improve its efficiency (e.g., via increasing its temperature).

As to a cold-start, it may refer to an attempt to start an engine when it is cold relative to its normal operating temperature. A cold-start scenario may be defined in one or more manners, for example, when lubricant and/or water are in still position for a minimum of 90 minutes before an attempted start. As to diesel engines, they tend to have more difficulty starting at low outside temperatures than gasoline engines because diesel fuel tends to be thicker (e.g., more viscous) than gasoline fuel. Due to low outside temperatures, diesel fuel tends to become thicker (e.g., more viscous) and thereby combust less efficiently. Cold-start scenarios may cause engine compression to be higher as the lack of heat can make ignition more difficult. Cold-start scenarios at low temperatures may involve reduced efficiency due to more viscous lubricant, making it more difficult to circulate the lubricant. Cold-start scenarios at low temperatures may involve alterations in air-fuel ratio due to increased density of air, which may affect flammability of an air-fuel mixture. Hence, at low temperatures, cold-start issues may be exacerbated. As an example, a valve may be operable to provide for heating of one or more catalysts and/or other materials of a treatment unit or treatment units by diverting at least a portion of exhaust of an internal combustion engine thereto.

As an example, where a turbocharger includes a variable nozzle turbine assembly, the variable nozzle turbine assembly may be adjusted to restrict flow to a turbine wheel disposed in a turbine wheel space. In such a manner, when a diversion valve is open, the restriction of the variable nozzle turbine assembly may promote more flow via the diversion valve.

As an example, one or more controllers may provide for coordinate control action between a valve and a variable nozzle turbine assembly for purposes of elevating temperature of a treatment unit (e.g., or units). In such an example, the valve and the variable nozzle turbine assembly may provide for restricting flow from an inlet of a turbine housing to a turbine wheel space such that flow to a diversion passage (e.g., bypass passage) is enhanced. As an example, a valve may include a plug that opens into an inlet passage such that the plug acts to help restrict flow. And, where a variable nozzle turbine assembly is also present, reducing nozzle space may further help to restrict flow. In combination, such mechanisms can help direct flow more towards a treatment unit rather than a turbine wheel space.

Figure 11A:
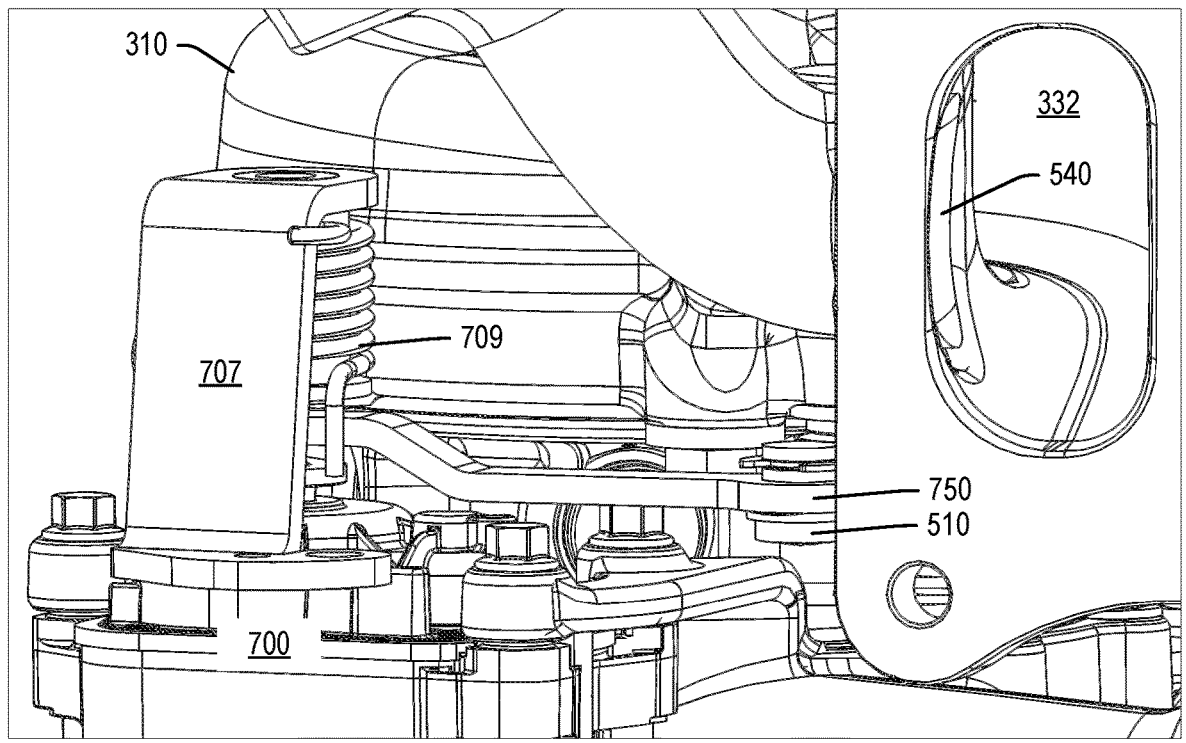
FIG. 11A and FIG. 11B are side views of an example of a portion of a system.
Figure 11B:
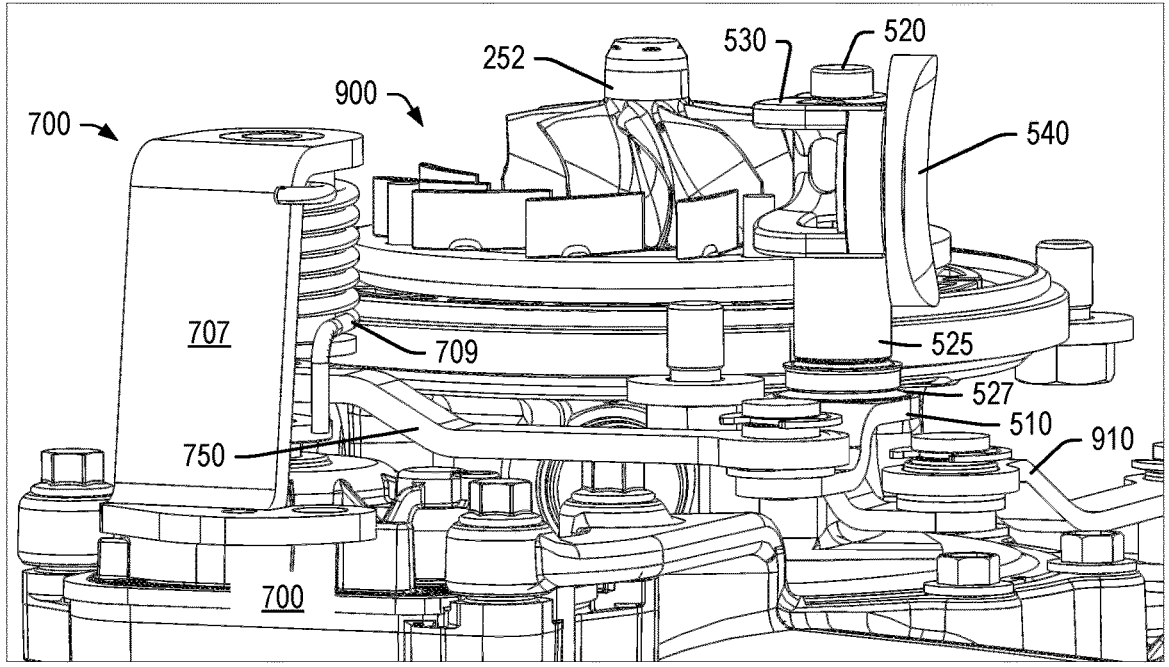
Figure 12:
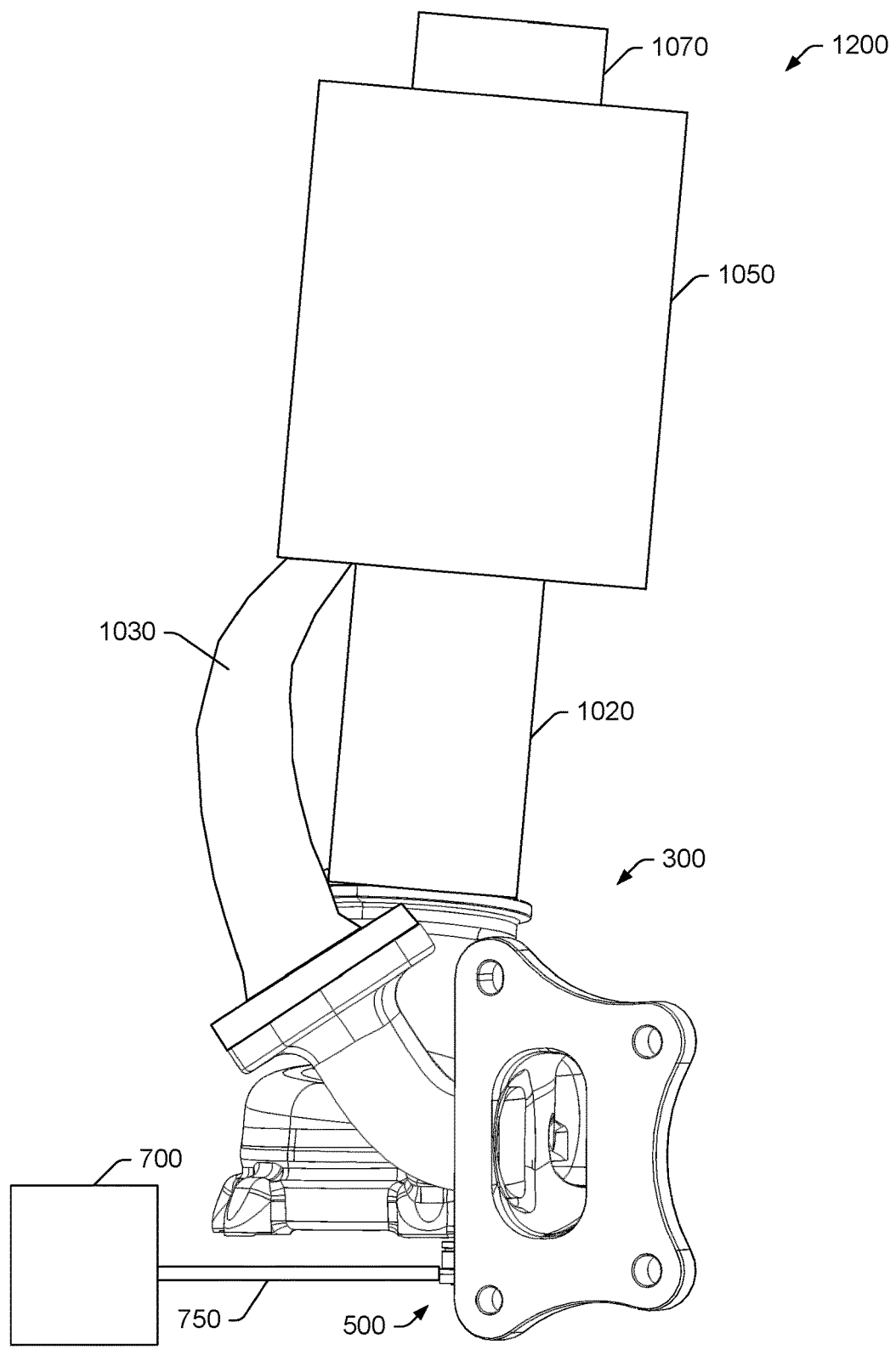
FIG. 12 is an approximated view of an example of a system.

FIGS. 3A, 3B, 4A, 4B, 5A, 5B, 6A and 6B show various views of an example of a turbine housing assembly 300 that includes an example of a valve 500 suitable for directing exhaust to a treatment unit. FIGS. 7, 8, 9 and 10 shows examples of the valve 500 or one or more portions thereof. FIGS. 11A and 11B show examples of a portion of a system and FIG. 12 shows an example of a system 1200 that can include a turbocharger where the turbocharger can include the turbine housing assembly 300 and, for example, a variable nozzle turbine assembly (see, e.g., the variable geometry assembly 129 of FIG. 1, the vanes 900 of FIG. 11B, etc.).

Figure 3A:
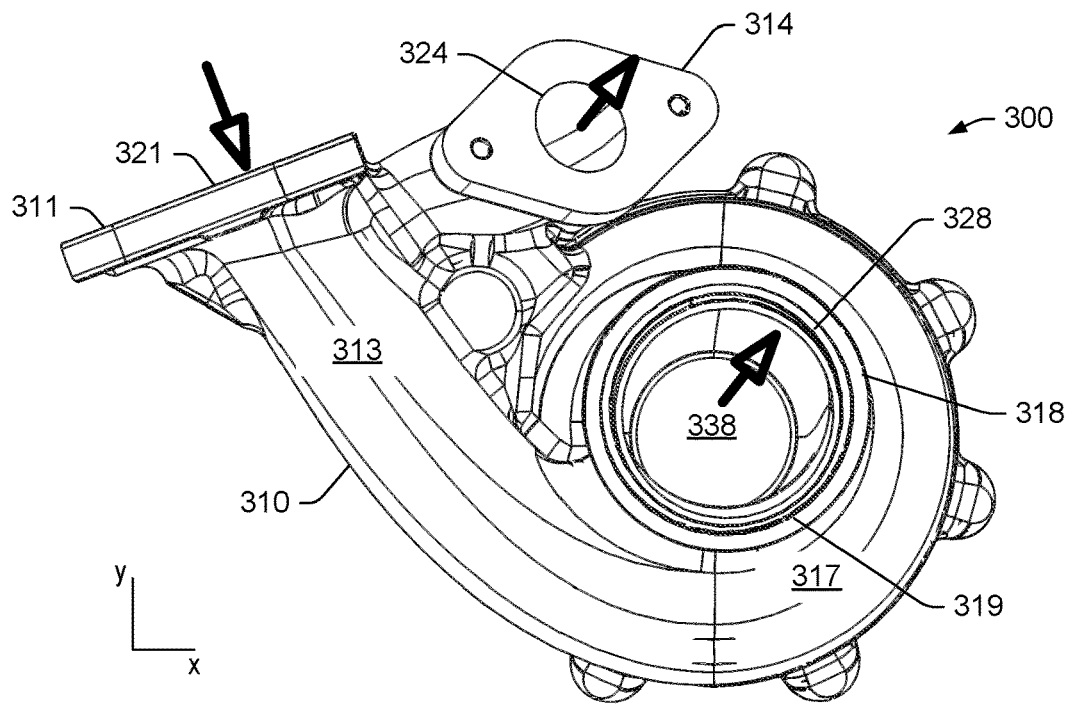
FIG. 3A and FIG. 3B are top and bottom views of an example of a turbine housing assembly; assembly.
Figure 3B:
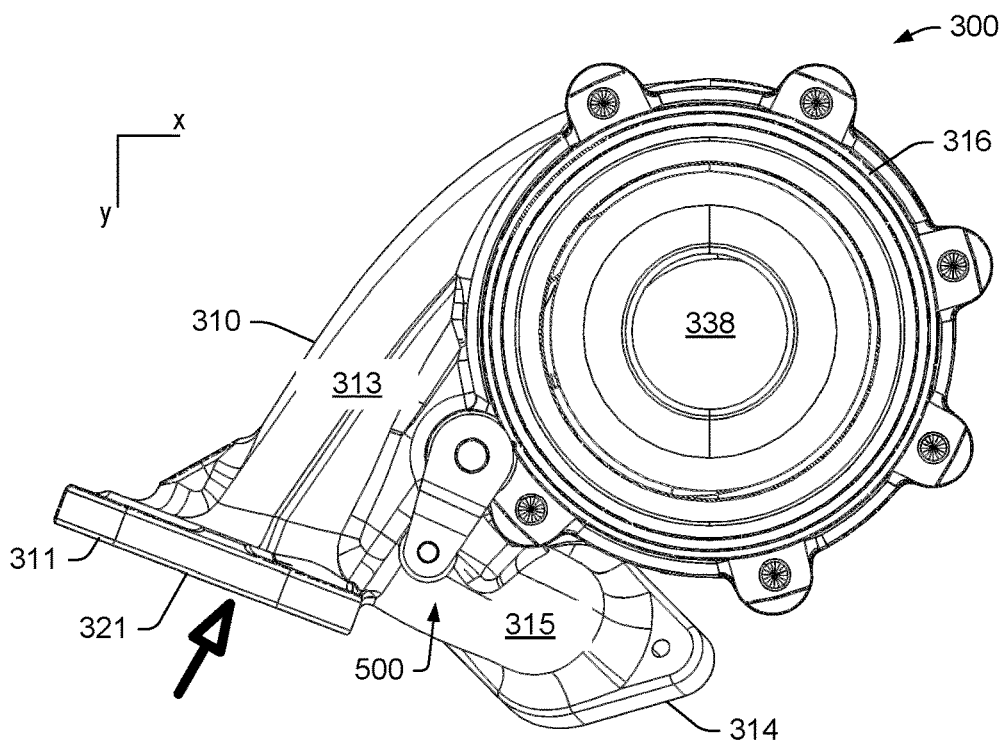

FIG. 3A and FIG. 3B show top and bottom views, respectively, of an example of a turbine housing assembly 300, where, for example, one or more features may be described with respect to one or more coordinate systems, which may include, for example, one or more Cartesian coordinate systems and/or one or more cylindrical coordinate systems. In the example of FIG. 3A and FIG. 3B, a Cartesian coordinate system is shown with x and y axes where a z axis may be out of the plane in FIG. 3A and into the plane in FIG. 3B. As to a cylindrical coordinate system, consider, as an example, a cylindrical coordinate system that includes a central axis centered with respect to a rotational axis of a turbine wheel disposed in a turbine wheel space of the turbine housing.

As shown in the example of FIG. 3A and FIG. 3B, the turbine housing assembly 300 includes a turbine housing 310 that includes an inlet flange 311, a diversion flange 314, a center housing flange 316, and an outlet flange 318. The turbine housing 310 is shown as including an inlet conduit portion 313, a diversion portion 315, a volute portion 317, and an outlet conduit portion 319, where an inlet passage defined by the inlet conduit portion 313 can direct exhaust to a volute defined by the volute portion 317 and where an outlet passage defined by the outlet conduit portion 319 can direct exhaust to another component such as, for example, an exhaust treatment component, an exhaust silencing component, etc. As to flow of exhaust, exhaust may enter via an inlet opening 321 of the inlet flange 311, flow via the inlet passage defined by the inlet conduit portion 313 to the volute defined by the volute portion 317 to a turbine wheel space 338, and then flow via the outlet passage defined by the outlet conduit portion 319 to exit via an outlet opening 328 of the outlet flange 318.

As shown, the turbine housing assembly further includes a valve 500 that can selectively open and close where, in an open position, the valve 500 provides for diversion of at least a portion of exhaust received via the inlet opening 321 to a diversion passage defined by the diversion portion 315 to exit via a diversion opening 324 of the diversion flange 314. In such a manner, the portion of exhaust that is diverted does not flow to the volute or to the turbine wheel space 338. As an example, the valve 500 may be operated to control energy provided to the turbine wheel space 338 and hence control energy extracted by a turbine wheel disposed in the turbine wheel space 338. As an example, the valve 500 may be positioned at least in part in a corner formed by the inlet portion 313 and the volute portion 317. In such an example, the valve 500 may not contribute substantially to enlarging a footprint of the turbine housing assembly 300, which may provide for fitting into one or more engine compartments, etc., without retrofitting, noting that some retrofitting may be provided for the diversion portion 315 and, for example, a fluid conduit to a treatment unit that is in fluid communication with a passage of the diversion portion 315.

In the example of FIG. 3A and FIG. 3B, open-headed arrows are shown to represent general directions of flow, for example, consider exhaust that flows into the turbine housing 310 via the inlet opening 321 and then flows through the turbine housing 310 to exit via one or more openings, such as, for example, the diversion opening 324 and/or the outlet opening 328. In various examples, exiting flow from the turbine housing assembly 300 via one or more openings, and/or percentages thereof, can depend on state of the valve 500 (e.g., position of the valve). As an example, the valve 500 may have a closed state and multiple open states (e.g., degrees of open).

As an example, the turbine housing assembly 300 may also include one or more additional openings. For example, consider one or more openings for exhaust gas recirculation (EGR), which may be controlled via one or more EGR valves, controllers, etc. As explained, a turbine housing assembly may include a wastegate, which may be an internal wastegate (see, e.g., the wastegate 135 of FIG. 1) or an external wastegate. As an example, a wastegate may include an opening.

Figure 4A:
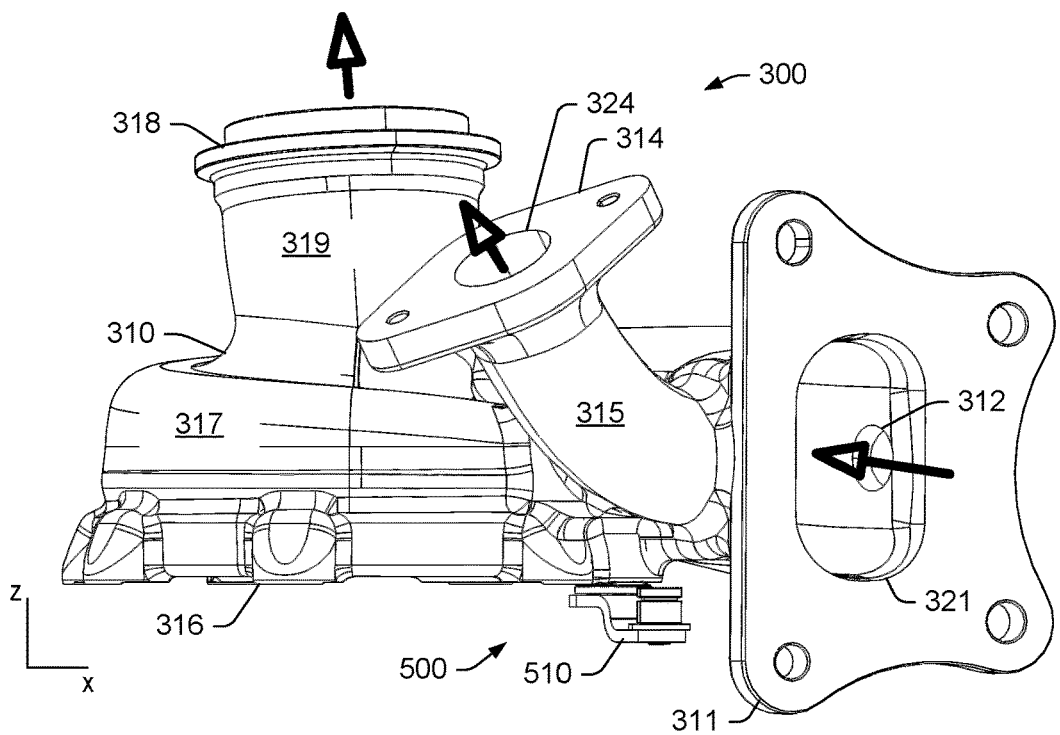
FIG. 4A and FIG. 4B are side views of an example of a turbine housing
Figure 4B:
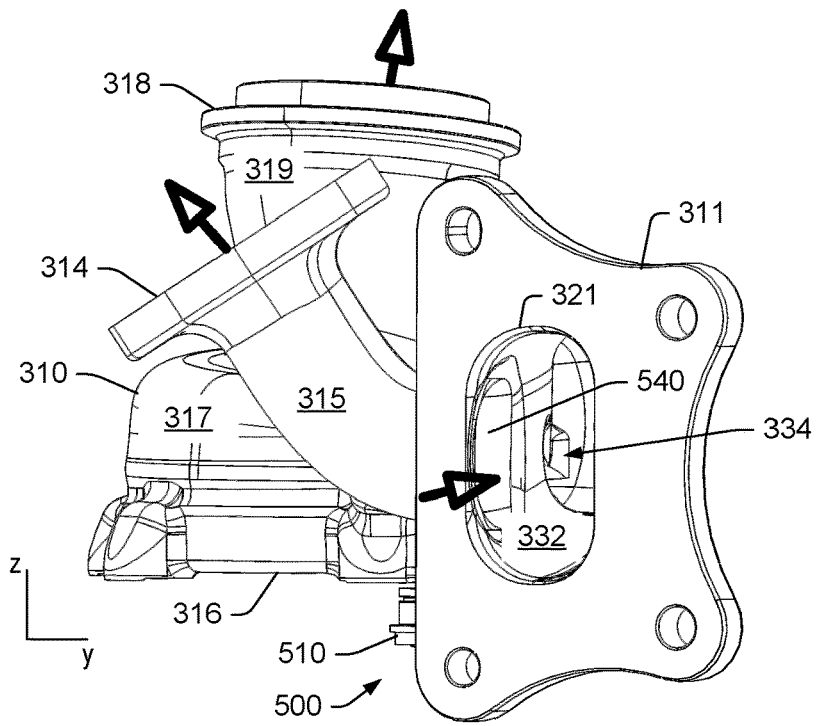

FIG. 4A and FIG. 4B show side views of the turbine housing assembly 300. As shown in FIG. 4B, the inlet opening 321 is in fluid communication with the inlet flow passage 332 that leads to the volute 334 that is in fluid communication with the turbine wheel space 338. As shown, the valve 500 can include a control arm 510 that is operatively coupled to a plug 540 such that movement of the control arm 510 (e.g., rotational movement) causes movement of the plug 540.

As shown in FIG. 4B, the plug 540 is positioned with respect to a valve seat disposed in the inlet conduit portion 313 of the turbine housing 310 such that upon opening of the valve 500, the plug 540 moves away from the valve seat and into the inlet passage 332 defined by the inlet conduit portion 313 of the turbine housing 310 to thereby expose an opening (e.g., or openings) that is surrounded by the valve seat. Flow may then enter a diversion passage defined by the diversion portion 315 of the turbine housing 310; noting that the diversion portion 315 may be at least in part cast integrally with the turbine housing 310 and/or at least in part formed by a separate component attached to the turbine housing 310 (e.g., as part of the turbine housing assembly 300).

In the example of FIG. 4B, upon transition of the valve 500 to an open state, an upstream edge of the plug 540 may travel an arc distance away from the valve seat such that the plug 540 impedes flow in the inlet passage between the inlet opening 321 and the volute 334. By impeding flow, a surface of the plug 540 can help to direct flow in the inlet passage 332 through the opening (e.g., or openings) surrounded by the valve seat and into the diversion passage defined by the diversion portion 315. As an example, the plug 540 can include opposing surfaces where one surface may be contoured similarly to an inside surface of the inlet passage 332 as defined by the inlet conduit portion 313. In such an example, when the valve 500 is in a closed state, the plug 540 may provide for lesser disturbance as to flow (e.g., approaching a flow profile akin to that of an inlet passage without the valve 500).

As explained, the turbine housing assembly 300 may include one or more openings for purposes of EGR and/or one or more other purposes. For example, in FIG. 4A, an opening 312 is shown, which is positioned proximate to the flange 311. As an example, an internal wastegate valve may be included, for example, proximate to the volute portion 317 and/or another portion to thereby provide for exhaust bypassing a turbine wheel space of the turbine housing assembly 300.

Figure 5A:
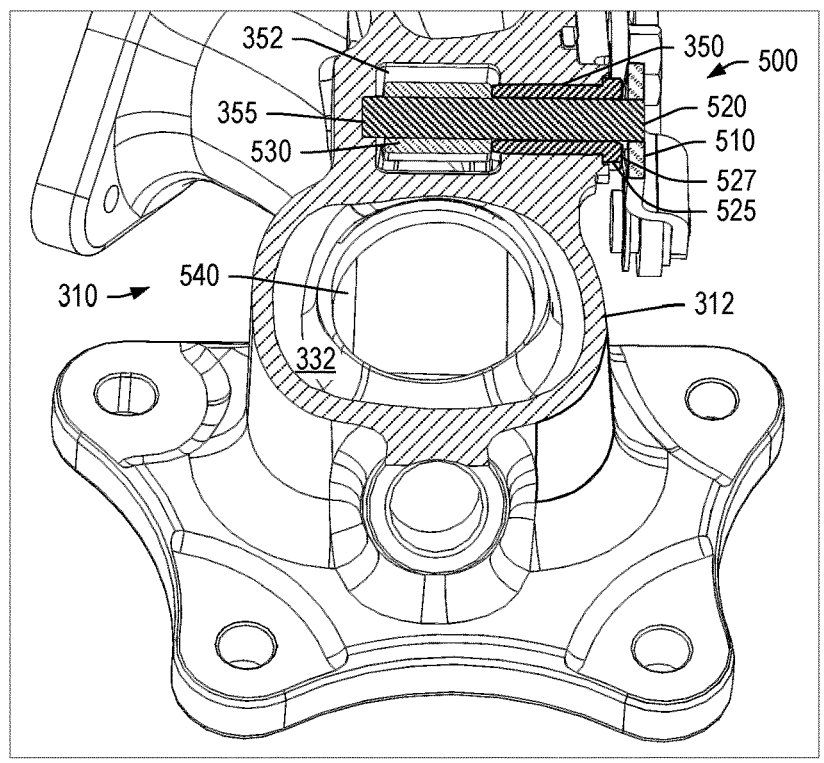
FIG. 5A and FIG. 5B are cut-away views of an example of a turbine housing assembly.
Figure 5B:
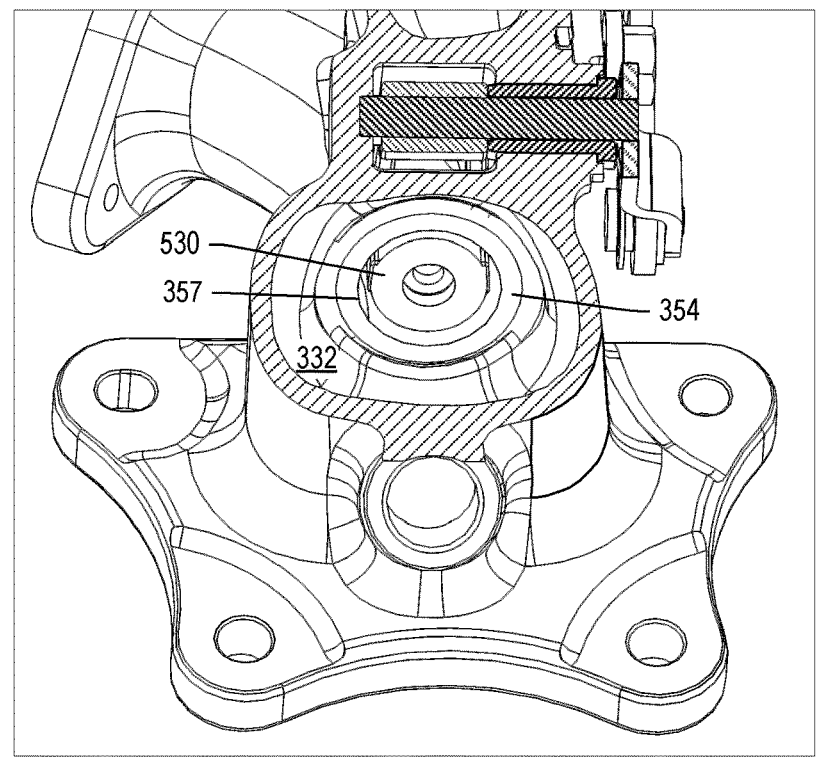

FIG. 5A and FIG. 5B show cut-away views of the turbine housing assembly 300, for example, to show various components of the valve 500. As shown in FIG. 5A, the turbine housing 310 includes a bore 350 for receipt of a shaft 520 that is coupled to the control arm 510 and coupled to an arm 530 that is coupled to the plug 540. The shaft 520 is supported by a bushing 525 disposed at least in part in the bore 350 and the shaft 520 is also supported by a socket 355 of the turbine housing 310. In such an example, the shaft 520 is rotatable about an axis of rotation via movement of the control arm 510 to thereby cause rotation of the arm 530 and hence the plug 540.

As shown, the turbine housing 310 includes a cavity 352 to accommodate a portion of the shaft 520 and the arm 530, particularly when the valve 500 is in a closed state (e.g., a closed position). As explained, in an open state, the plug 540 extends into the inlet passage 332, noting that at least a portion of the arm 530 may also extend into the inlet passage 332.

As shown in FIG. 5A, an end surface of a portion of the arm 530 may be a substantially annular surface that may abut an end surface of the bushing 525. In such an example, a spring 527 may be disposed between the bushing 525 and the control arm 510. For example, consider a spring that may be a coil spring, a cone spring (e.g., a cone or Belleville washer), etc. In such an example, the spring 527 may apply a force between an end surface of the bushing 525 and a surface of the control arm 510. As an example, the force may cause the arm 530 to contact the bushing 525; noting that the bushing 525 may be fixed within the bore 350, for example, via an interference fit. Hence, rotation of the shaft 520 may cause some amount of friction between the arm 530 and the bushing 525, which may be controlled by force applied by the spring 527 (e.g., consider a spring constant that may define a relationship between the spring and the amount of force). As an example, such an arrangement may help to reduce leakage of exhaust from the cavity 352 to an exterior region outside of the turbine housing 310. As an example, spring related friction between the arm 530 and the bushing 525 and/or between the bushing 525 and the control arm 510 may help to reduce undesirable movement of the arm 530 (e.g., responsive to shock and/or vibration, etc.), which may help to improve sealing of the plug 540 with respect to the turbine housing 310.

As an example, the spring 527 may include an inner diameter that is sufficient to position the spring 527 about the shaft 520 where, for example, the inner diameter may be approximately the same size or slightly larger than an outer diameter of the shaft 520. In such an example, the spring 527 may offer some resistance (e.g., hindrance) to flow of exhaust through a clearance between the outer diameter of the shaft 520 and an inner diameter of the bushing 525, for example, to reduce leakage of exhaust from the cavity 352 to an exterior region outside of the turbine housing 310. As an example, where a cone spring (e.g., cone washer, Belleville washer, etc.) is utilized, it may be oriented with its cone end contacting the bushing 525 or with its cone end contacting the control arm 510. As an example, even where the inner diameter of the spring 527 is larger than the outer diameter of the shaft 520, where the cone end is forcibly biased against a surface of the control arm 510, the spring may provide for reduce leakage of exhaust as a seal may be formed between the spring 527 and an end of the bushing 525 and between the spring 527 and the surface of the control arm 510.

As an example, a spring may be designed with a difference between an inner diameter and an outer diameter where an increase in the difference may help to reduce stress and increase operational lifetime of the spring. As an example, a spring may be a single component spring, a multi-component spring, a multi-turn wave washer, etc.

As an example, the spring 527 may be disposed between the bushing 525 and the control arm 510 to help damp component vibrations and reduce rattling noise. As an example, leakage may be reduced by use of an interference fit between an outer diameter of the bushing 525 and an inner diameter of the bore 350. As an example, leakage may be reduced between the shaft 520 and the bushing 525 using one or more components, which may include, for example, one or more piston rings (e.g., disposed against a surface, seated in a slot, etc.) and/or by utilization of a cone washer (e.g., a cone spring, etc.).

In FIG. 5B, the plug 540 is not shown such that the valve seat 354 may be shown where the valve seat 354 surrounds an opening 357 to the cavity 352. Without the plug 540, a portion of the arm 530 of the valve 500 can also be seen in FIG. 5B.

As an example, a spring may be disposed between the arm 530 and the plug 540. In such an example, the spring disposed between the arm 530 and the plug 540 may provide for reduced rattling, noise, etc., where the plug 540 is in an open position where it may be exposed to force from exhaust flow, which may include pulsations (e.g., due to firing order of pistons of an internal combustion engine, etc.), and/or one or more other sources (e.g., road shocks, engine vibrations, etc.). As an example, an arm and a plug may be a unitary component such that vibrations between the arm and the plug do not exist. In such an example, the unitary component may be referred to as a monoblock arm and plug. As an example, an arm, a plug and a shaft may be a unitary component (e.g., a monoblock arm, plug and shaft); however, such an approach may demand adequate configuration of a turbine housing for purposes of assembly.

Figure 6A:
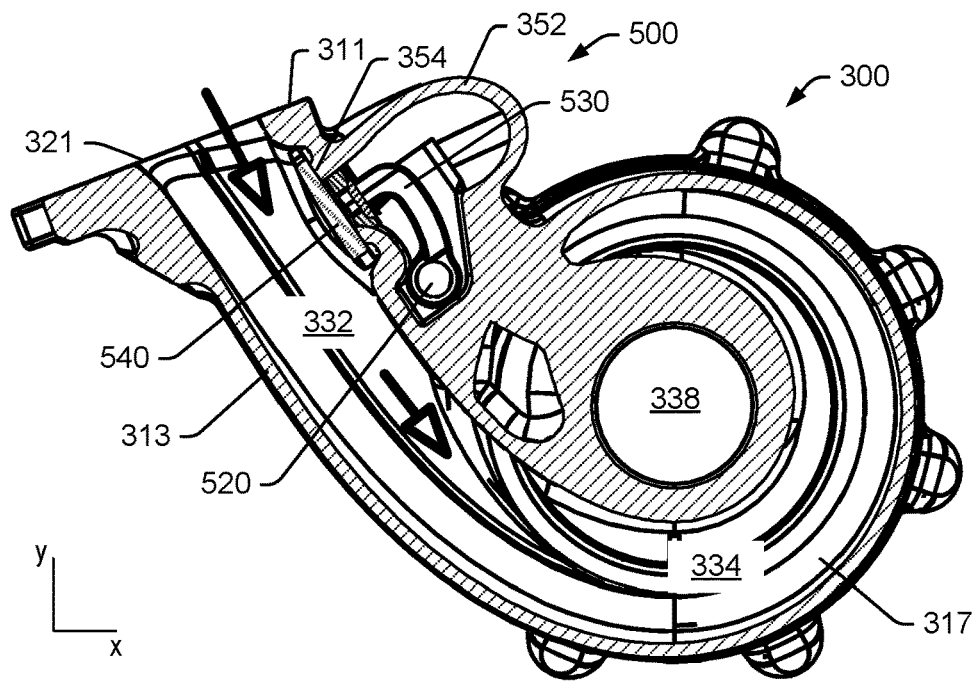
FIG. 6A and FIG. 6B are cut-away views of an example of a turbine housing assembly.
Figure 6B:
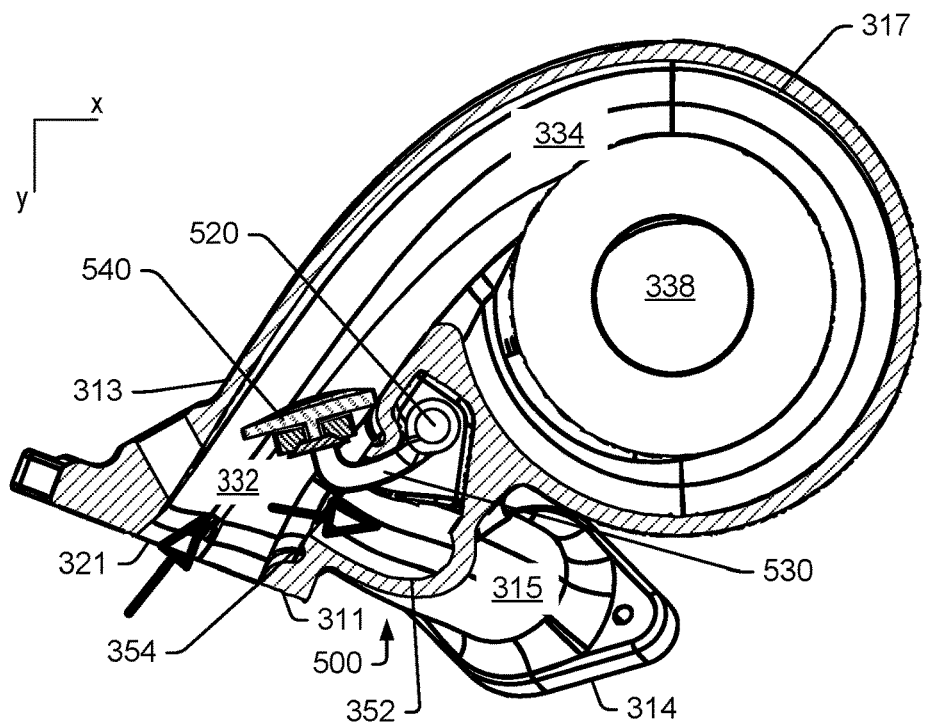

FIG. 6A and FIG. 6B show cut-away views of the turbine housing assembly 300. In FIG. 6A and FIG. 6B, the inlet passage 332, the volute 334 and the turbine wheel space 338 are shown. As explained, the valve 500 includes the shaft 520, the arm 530 and the plug 540 where the plug 540 can move into the inlet passage 332 to impede flow from the inlet passage 332 to the volute 334 and to direct flow from the inlet passage 332 though the opening 357 surrounded by the valve seat 354 such that flow enters the cavity 352 and the diversion passage, as defined by the diversion portion 315 of the turbine housing 300. For example, in FIG. 6A, the valve 500 is shown in a closed position; whereas, in FIG. 6B, the valve 500 is shown in an open position.

As shown in FIG. 6B, the plug 540 is in an open position where the plug 540 is no longer in contact with the valve seat 354 where the contact surface of the plug 540 is positioned within the inlet passage 332 such that the contact surface of the plug 540 may act as an obstacle surface where flow can impinge upon the contact surface and be diverted (e.g., directed) at least in part toward the opening 357 and the cavity 352 to flow to the diversion passage of the diversion portion 315. As an example, the arm 530 of the valve 500 may be shaped with tines, extensions, etc., that may provide for reduced interference with flow from the inlet passage 332 to the cavity 352. As an example, the arm 530 may be shaped to help direct flow to the opening 357, to the cavity 352 and/or within the cavity 352 when the valve 500 is in an open position.

Figure 7:
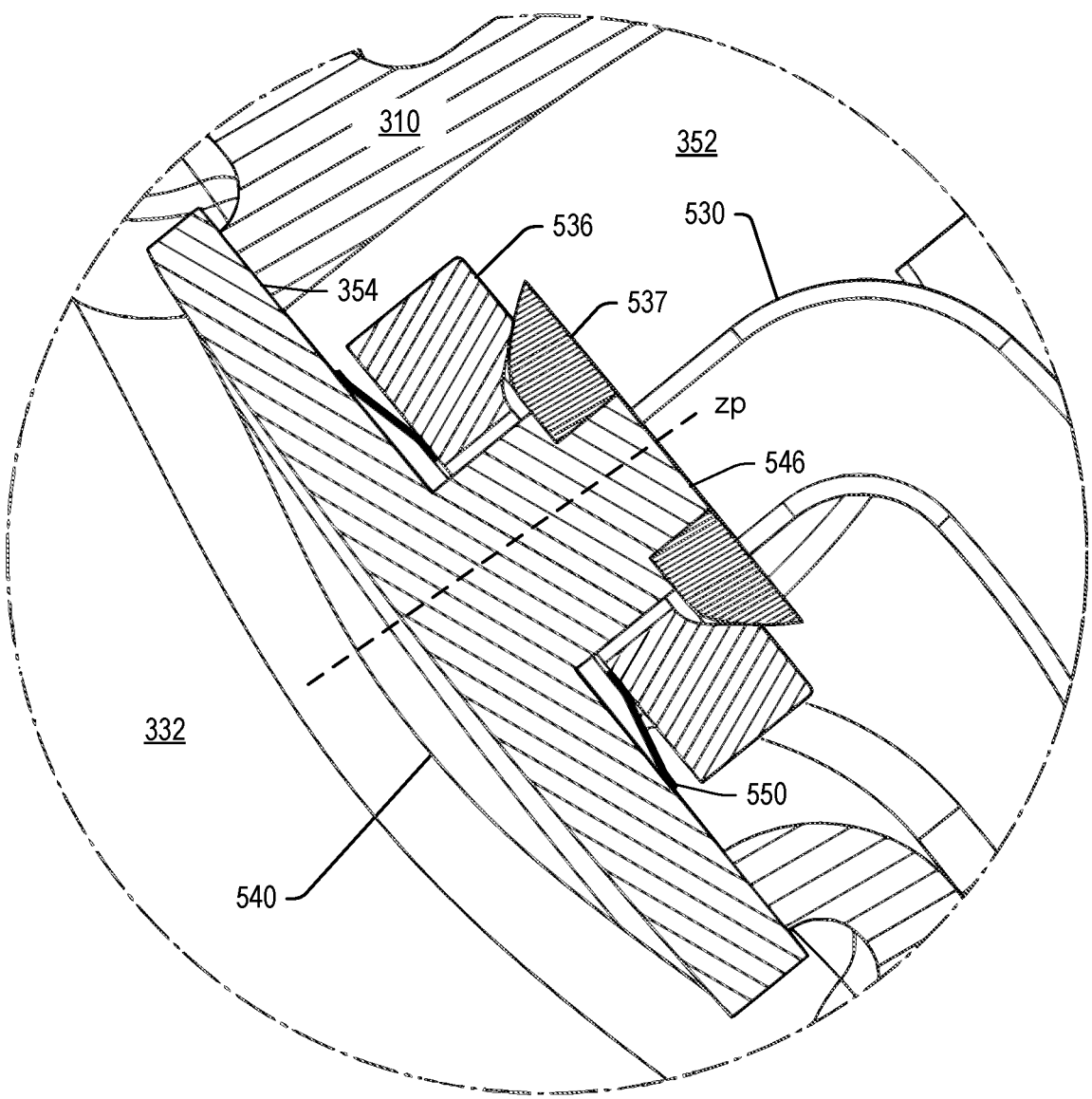
FIG. 7 is a cut-away view of a portion of an assembly.

FIG. 7 shows cut-away view of a portion of an assembly that includes the turbine housing 310 as defining, at least in part, the passage 332 and the cavity 352, the arm 530 and the plug 540. As shown, a portion of the arm 536 may provide for coupling to the plug 540 (e.g., consider a ring portion coupled to the tines 534-1 and 534-2). For example, consider inserting a post 546 of the plug 540 through an opening of the portion of the arm 536 followed by positioning a washer or cap 537 on the post 546, which may be welded to the post 546 or otherwise fixed to the post 546. As mentioned, a spring 550 may be positioned with respect to the arm 530 and the plug 540, which may help to reduce rattling, noise, wear, etc., when the plug 540 is in an open position (e.g., an open state). As shown in the example of FIG. 7, the spring 550 may be a cone spring (e.g., a Belleville washer, etc.), which may be a single component spring or a multiple component spring.

In the example of FIG. 7, the plug 540 is closed whereby a surface of the plug 540 is in contact with the valve seat 354 to thereby form a seal between the passage 332 and the cavity 352. As explained, the plug 540 may be shaped to conform to a wall of the passage 332 such that it reduces risks of flow disturbances in the passage 332 when the plug 540 is closed.

Figure 8:
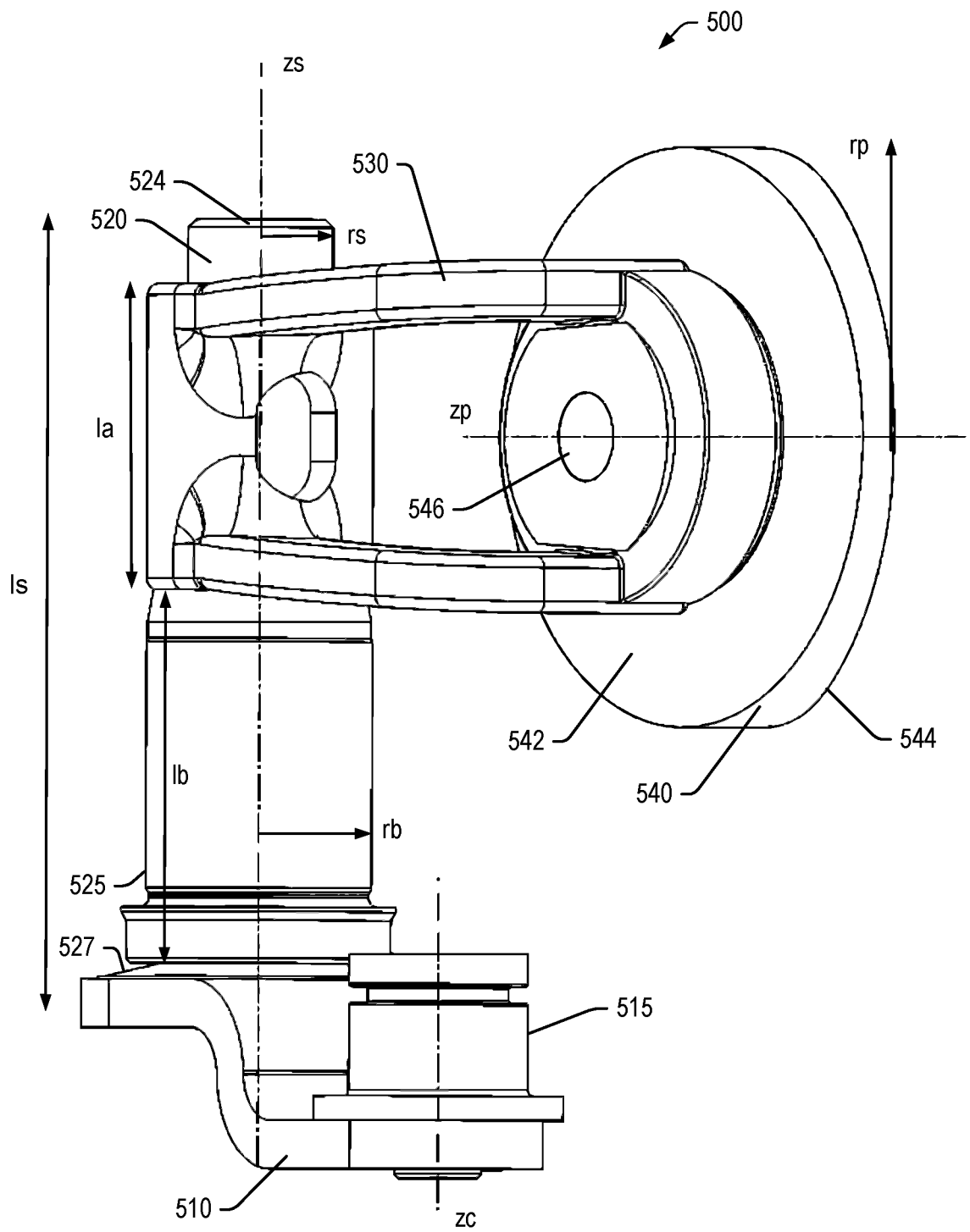
FIG. 8 is a side view of an example of a valve.

FIG. 8 shows a side view of the valve 500 where the control arm 510 and the arm 530 are coupled to the shaft 520 and where the plug 540 is coupled to the arm 530. In such an example, the valve 500 may include the spring 527. As shown, the bushing 525 may be included and, for example, disposed on the shaft 520 where the spring 527 may be disposed between the bushing 525 and the control arm 510 (e.g., with an axial length that may vary slightly upon application of force, which may be according to a spring constant and Hooke's law). In exhaust turbine housing assemblies, leakage of exhaust to the environment can be detrimental. Thus, a seal mechanism may be employed, which may include one or more gaskets and/or springs. For example, an arrangement of the bushing 525, the control arm 510, and the spring 527 may provide for reducing leakage of exhaust from an interior space within a turbine housing assembly to an exterior space.

As explained, to transition the valve 500 to an open position, force may be applied to the control arm 510 to thereby rotate the shaft 520 and hence the arm 530 and the plug 540 to move the plug 540 away from the valve seat 354 such that exhaust can flow from the inlet passage 332 to the cavity 352 via the opening 357.

In the example of FIG. 8, the plug 540 includes opposing surfaces 542 and 544 where the surface 542 is a sealing surface that seats against at least a portion of the valve seat 354 to seal the cavity 352 from the inlet passage 332. As explained, the surface 544 of the plug 540 may be contoured and/or otherwise shaped to reduce flow disturbance in the inlet passage 332 when the valve 500 is in a closed state (e.g., the plug 540 is in a closed position). As an example, an area of the surface 544 of the plug 540 may be tailored to provide for an amount of fluid pressure force that may act to help keep the plug 540 in a closed position. For example, a contoured surface may have greater surface area than a flat surface such that more fluid pressure is exerted for the greater surface area that is contoured rather than flat. As an example, a size and/or shape of the plug 540 may provide for helping to maintain the plug 540 closed and/or for helping to direct flow to the cavity 352. For example, the surface 544 may be shaped and/or sized to help keep the plug 540 closed (e.g., to reduce risk of inadvertent flow to the cavity 352) and the surface 542 may be shaped and/or sized to help direct flow to the cavity 352.

As explained, the arm 530 may include coupling features that can couple to the post 546 of the plug 540; noting that one or more types of couplings may be employed.

As an example, the arm 530 may be welded or otherwise attached to the shaft 520. During assembly, the shaft 520 may be inserted as a separate component where the arm 530 may be inserted into position in the cavity 352 via the inlet opening 321 of the inlet flow passage 332. As an example, consider an assembly process where the arm 530 is positioned followed by positioning of the shaft 520. In such an example, the shaft 520 and the arm 530 may be coupled via an interference fit, which may be sufficiently strong to withstand changes in temperature and other forces. For example, an end of the arm 530 may include resilient features that can expand slightly responsive to force applied by the shaft 520 as it is driven into place. In such an example, the plug 540 may be coupled to the arm 530 such that an appropriately aligned close state is achieved prior to forcing the shaft 520 into place. Or, for example, the shaft 520 may be coupled to the arm 530 and then the control arm 510 positioned appropriately on the shaft 520 such that it is in a properly aligned position for control of the valve 500. As explained, one or more types of monoblocks may be utilized. For example, consider a monoblock arm and shaft, a monoblock plug and arm, a monoblock plug, arm and shaft.

In the example of FIG. 8, various coordinates and dimensions are shown, including, for example, a shaft axis zs, a plug axis zp, a control arm axis zc, a shaft length ls, an arm-shaft connection length la, a bushing length lb, a shaft radius rs, a bushing radius rb and a plug radius rp. As shown, the plug 540 may be substantially circular and may be defined by a diameter (e.g., two times rp) where the plug 540 may include a portion that extends beyond a distal end 524 of the shaft 520; noting that the control arm 510 may be coupled to a proximal end of the shaft 520, which may have a radius that is less than rs. As shown, the control arm 510 may include a coupling 515, for example, for operatively connecting the control arm 510 to an actuator and/or a linkage of an actuator.

Figure 9:
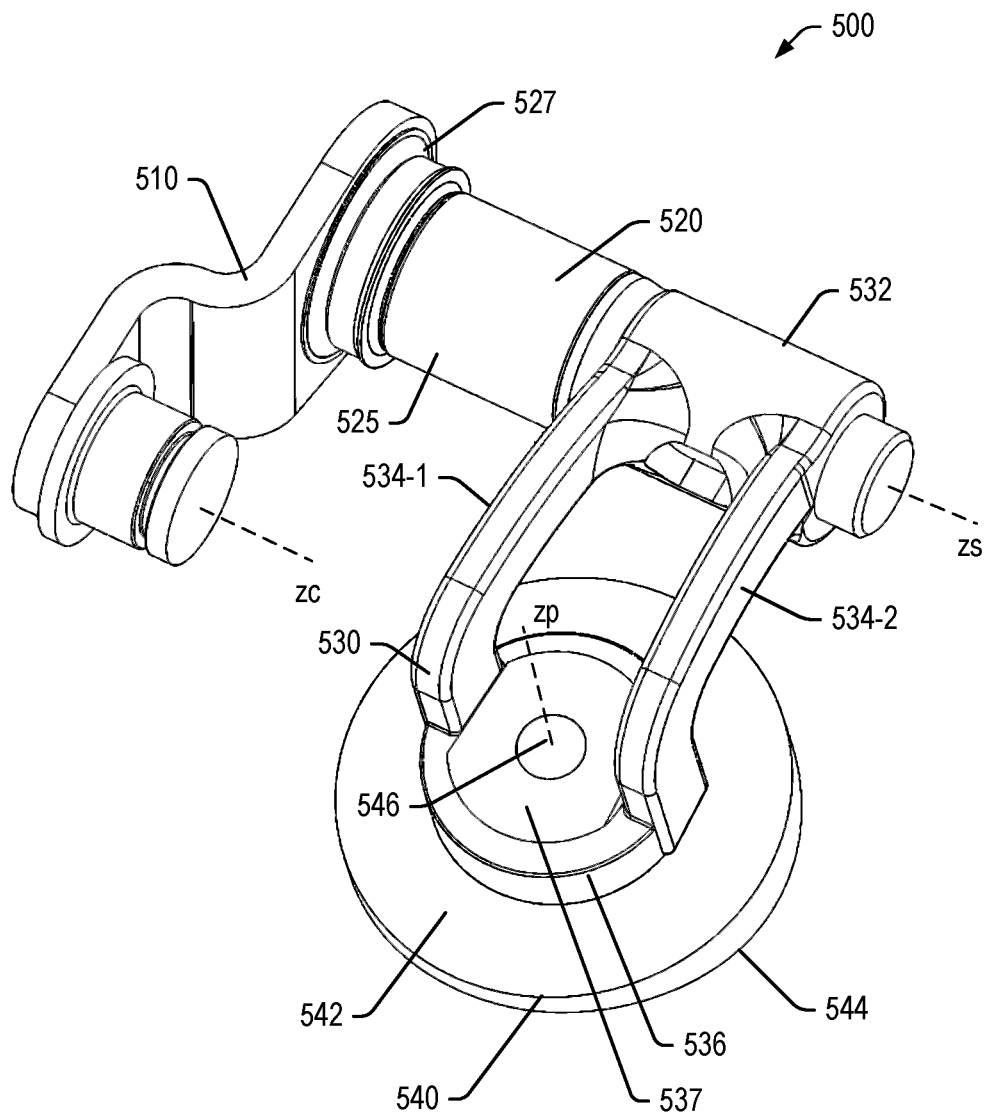
FIG. 9 is a perspective view of an example of a valve.

FIG. 9 shows a perspective view of the valve 500. As shown, the arm 530 may include a number of portions. For example, consider a forked arm that can include tines 534-1 and 534-2, which may extend from a portion of the arm 530 that couples to the shaft 520 and that extend to a coupling feature of the arm 530 that couples to the plug 540. As an example, the arm 530 and the plug 540 may be fixedly coupled or may be coupled in a manner that provides for some amount of movement between the arm 530 and the plug 540 (e.g., some amount of tilting). In general, where the plug 540 is contoured and/or otherwise shaped to reduce flow disturbances in the inlet passage 332 when in a closed state, the orientation of the plug 540 with respect to the arm 530 may be fixed. For example, the plug 540 may be prevented from rotating about an axis of the post 546 to thereby maintain properly alignment of surface features of the surface 544 of the plug 540.

As mentioned, the arm 530 may include tines, extensions, etc. For example, the arm 530 may be forked arm with the tines 534-1 and 534-2 that bridge a connector, as the portion of the arm 536, for coupling to the plug 540 and with a connector 532 for coupling to the shaft 520. As shown, the connector 532 may include a bore that can receive the shaft 520. As an example, the connector 532 may provide an opening for forming a weld to weld the arm 530 to the shaft 520. In the example of FIG. 9, the tine 534-1 may be referred to as a proximal tine (e.g., a control arm side tine) and the tine 534-2 may be referred to as a distal tine. As shown, a gap exists between the two tines 534-1 and 534-2 such that flow may be relatively unobstructed when the valve 500 is in an open position, for example, to facilitate flow to the cavity 352 of the turbine housing assembly 300. As explained, in an open position, flow may impinge a surface of the plug 540 such as the surface 542 where flow is then directed to the cavity 352 where the arm 530 may be shaped and/or sized to reduce impeding flow. As an example, the arm 530 and the plug 540 may be a single piece (e.g., a monoblock arm and plug). In such an example, the piece may be positioned at least in part in the cavity 352 with respect to the valve seat 354 where the shaft 520 may be inserted as a separate component that may be interference fit with an opening of the arm 530, noting that in an open position of the plug 540, a tool may be inserted into the cavity 352 to form a weld between the arm 530 and the shaft 520 or to otherwise help couple the arm 530 and the shaft 520.

Figure 10:
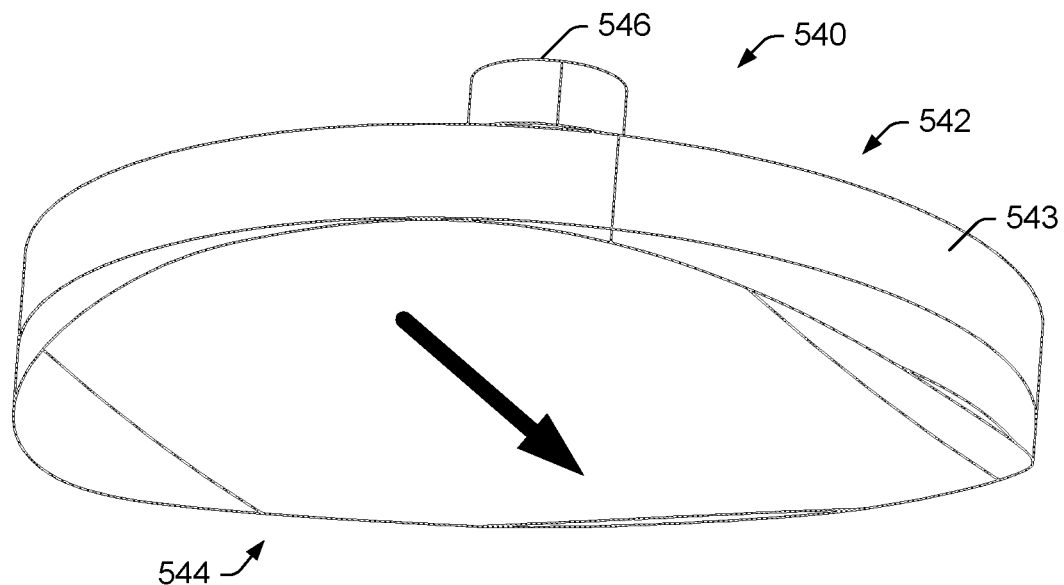
FIG. 10 is a perspective of an example of a portion of a valve.

FIG. 10 shows a perspective view of an example of the plug 540 where a perimeter 543 may be substantially circular and where the surface 544 may be contoured such that a thickness of the plug 540 is greater at opposing edges and lesser between the opposing edges. In such an example, the plug 540 may be asymmetric where a particular direction is a flow direction as indicated by an arrow. As shown, the surface 544 may be shaped as a portion of a cylinder where, for example, the inlet conduit portion 313 provides for the inlet flow passage 332 to have at least a portion of a cylindrical shape; noting that a recess for receiving the plug 540 may be present at the valve seat 352 such that, in a closed state, the perimeter 543 of the plug 540 is seated at least in part within the recess. As explained, a surface shape and/or size may be tailored for one or more purposes such as, for example, increasing surface area and/or reducing flow disturbance (e.g., when a valve is closed).

FIG. 11A and FIG. 11B show an example of a portion of a system that includes the turbine housing 310 (see FIG. 11A) and the valve 500 where a controller 700 may be operatively coupled to the control arm 510 of the valve 500 to move the plug 540. As shown, the controller 700 may be coupled to a control linkage 750 that provides for coupling to the control arm 510. In such an example, one or more spring mechanisms may be utilized to help maintain the plug 540 in a closed position. For example, consider a mount 707 that may provide for mounting of a spring 709 (e.g., a coil spring) that can bias the control linkage 750 to apply a biasing force on the control arm 510 to thereby help forcibly bias the plug 540 against the valve seat 354. In such an example, the controller 700 may be in a low or no power state such that power is not required to maintain the closed position of the plug 540. In such an example, where conditions call for transitioning the plug 540 to an open position, the controller 700 may be powered such that a biasing force of the spring 709 may be overcome to move the plug 540 away from the valve seat 354 such that exhaust may flow from the passage 332 to the cavity 352. As an example, a controller and linkage may be configured to push to open a valve or to pull to open a valve.

In FIG. 11B, the portion of the system is shown without the turbine housing 310. As shown, the turbine wheel 252 may be surrounded radially by a number of vanes 900 that can define throats for passage of exhaust from the passage 332 to the turbine wheel 252 via the volute 334 where, for example, the vanes 900 may be controllable via another actuator that may include a control linkage 910. In such an example, the actuator may provide for adjusting the throats, for example, between closed or minimal flow positions (e.g., a closed state or minimum flow state) and open positions (e.g., one or more open states of a variable nozzle turbine, etc.). In the closed or minimal flow positions, the vanes 900 may hinder flow of exhaust to the turbine wheel 252 such that flow may be flow more readily from the passage 332 to the cavity 352 when the plug 540 is in an open position. For example, resistance to flow may be created such that flow preferentially flows to the cavity 352 when the plug 540 is in an open position (e.g., an open state). As an example, one or more controllers, actuators, etc., may be operatively coupled, synchronized, etc., such that control of the valve 500 and control of the vanes 900 may occur in a coordinated manner. In such an example, coordinated control of the valve 500 and the vanes 900 may be utilized to facilitate heating of one or more treatment units (e.g., catalyst, etc.).

FIG. 12 shows an example of a system 1200 that includes the turbine housing assembly 300, which includes the valve 500, along with the controller 700 with the control linkage 750 operatively coupled to the valve 500 for controlling movement of the plug 540 of the valve 500. In the example of FIG. 12, a conduit 1020 can be in fluid communication with a treatment unit 1050 that is in fluid communication with a conduit 1070 that may include an opening at an end of the conduit 1070 that is in fluid communication with an environment (e.g., at atmospheric pressure). As shown, the diversion passage of the diversion portion 315 may be in fluid communication with a conduit 1030 that is in fluid communication with the treatment unit 1050. In such an example, the controller 700 may control operation of the valve 500 to control flow of exhaust into the treatment unit 1050 in a manner where the exhaust diverted bypasses a turbine wheel positioned in the turbine wheel space 338 of the turbine housing 310. The system 1200 is shown schematically, noting that the shapes, sizes, etc., of the conduits 1020, 1030, 1070 and/or the treatment unit 1050 may vary (e.g., according to arrangement in an engine compartment of a vehicle, etc.).

As an example, the controller 700 of FIG. 12 may include one or more features of the controller 190 of FIG. 1, which may be operatively coupled to one or more actuators, sensors, etc. As an example, a controller may provide for control of one or more of a valve for exhaust bypass to a treatment unit, a variable nozzle turbine assembly (see, e.g., the vanes 900 of FIG. 11B) and a wastegate (see, e.g., the wastegate 135 of FIG. 1). As an example, the controller 700 may provide for a push to open or a pull to open linkage for the valve 500. As an example, one or more springs may be utilized to help maintain the valve 500 in a closed position (see, e.g., the spring 709 of FIG. 11A), which may help to reduce leakage to the cavity 352 of exhaust to increase the amount of exhaust directed to a turbine wheel space. As an example, a spring or springs may be disposed in the cavity 352 to forcibly bias the plug 540 against the valve seat 354.

As an example, the system 1200 may provide for flow control of exhaust gas to a catalyst via a bypass channel. As an example, such a system may include a variable nozzle turbine turbocharger that includes a controller for control of nozzle position, which may be via control of a set or sets of vanes disposed in a space between a volute and a turbine wheel space. As explained, a turbine housing may be used to convey exhaust gas from an engine manifold or a cylinder head to a turbine wheel. In the turbine housing there can be a specific gas passage or channel created to allow passage of exhaust gas directly from the turbine inlet to a separate outlet, which may be used solely for the purpose of connection to an exhaust catalyst or similar aftertreatment device. Flow into the bypass channel may be controlled by a moveable valve such as, for example, the valve 500, which is formed from a number of components (e.g., a valve assembly). As explained, a valve may include a plug with a flat sealing area, mounted into an arm which is fixed onto a shaft, itself able to rotate within a bearing bushing supported by mounting bosses in the turbine housing. As explained, a side of the plug may be shaped to substantially replicate the shape of an inlet passage, so as to reduce flow losses and performance impact due to the presence of the valve.

As to a method of operation, consider, as an example, a cold-start scenario where, during cold-start operation (e.g., where exhaust energy is not necessarily required by a turbocharger turbine wheel, and may be required to heat up an exhaust aftertreatment device (e.g., a treatment unit)), a valve may be transitioned from a closed state to an open state by way of an actuator (e.g., an electric or pneumatic device) that may be controlled by one or more controller (e.g., consider an Engine Control Unit (ECU)) such that exhaust can flow into a bypass channel that upstream a turbine wheel space whereby the bypass channel (e.g., diversion passage) is in fluid communication with a treatment unit. As an example, a controller may act to transition vanes of a variable nozzle assembly such that they are in a closed position (e.g., a closed state of throats defined between adjacent vanes, noting that spacings may exist between vanes such that they do not contact one another). In such an example, the closing of the vanes may help to increase flow restriction to the turbine wheel space and hence to a turbine wheel disposed therein to thereby increase flow through the bypass channel (e.g., diversion passage) to thereby increase energy delivered to the treatment unit (e.g., to increase temperature of a catalyst, etc.).

As an example, a method may, during normal operation (e.g., outside of cold-start usage), operate a valve such that it is in a closed state (e.g., closed against its turbine housing valve seat); thereby blocking flow into a bypass channel and allowing for normal turbocharger operation.

As an example, a controller and/or actuator may utilize one or more mechanisms to maintain a valve in a closed state without expending energy. For example, a passive approach may utilize one or more springs to hold a plug of a valve closed without actuator effort while also helping to prevent leakage and vibration and/or noise.

As explained, a valve can include a plug that, in an open state, protrudes into an inlet passage, which may be different than how a wastegate operates in that a wastegate tends to operate by opening away from a region that is a source of exhaust and into a lower pressure region.

As an example, a valve can include a shaft and one or more bushings (e.g., bearings, etc.) that may be disposed in a relatively low pressure region of a turbine housing. In such an approach, leakage may be reduced such that the risk of untreated engine-out emissions passing directly to atmosphere without passing through an exhaust aftertreatment system is reduced.

Emissions from an internal combustion engine can include constituents such as carbon monoxide, unburnt hydrocarbons and nitrogen oxides. Catalytic converters (e.g., treatment units) can reduce emissions. As an example, a catalytic converter can include one or more types of catalyst assemblies. For example, consider a concentric approach, a spiral approach, etc., which may provide relatively straight passages along a length of a catalytic converters. As an example, consider a cordierite ceramic monolith that may be formed into a honeycomb-like structure with straight channels. In various instances, straight channels may help to reduce pressure losses and provide for higher conversion efficiency of pollutants due to better flow distribution.

As an example, a bypass passage may be introduced into a treatment unit in a manner that may help to promote flow uniformity in the treatment unit. As an example, a bypass passage may join another passage and/or may include its own entrance to a treatment unit.

As explained, function of a catalyst of a treatment unit can depend on heat distribution to the inlet of the treatment unit. A flow uniformity index can be utilized to define how uniform flow is at an inlet or, for example, computational fluid dynamics (CFD) may be utilized where flow and flow patterns may be analyzed (e.g., contours, streamlines, etc.). As explained, an increase in flow uniformity can increase catalyst reaction efficiency.

As an example, a turbine housing assembly (300) can include an inlet conduit portion (313) of a turbine housing (310) that defines an inlet passage (332) having an inlet opening (321), where the inlet conduit portion includes a bore (350), a cavity (352), and a valve seat (354), where the inlet passage is in fluid communication with the cavity via an opening (357) surrounded by the valve seat; a volute portion (317) of the turbine housing (310) that defines a volute (334) that is in fluid communication with the inlet passage and a turbine wheel space (338) for a turbine wheel; a valve (500) that includes a control arm (510) and a shaft (520) coupled to an arm (530) coupled to a plug (540), where the shaft is rotatably supported by a bushing (525) disposed in the bore and where, in a closed state of the valve, the arm is disposed in the cavity; and a controller (700) operatively coupled to the control arm to transition the valve between the closed state and an open state, where, in the open state, the plug moves into the inlet passage to restrict flow between the inlet opening and the volute and to direct flow to the cavity, where the cavity is in fluid communication with a treatment unit.

As an example, a plug can include a planar valve seat side and a contoured inlet passage side.

As an example, a turbine housing assembly may include a diversion passage in fluid communication with a cavity and a treatment unit.

As an example, a turbine housing assembly may include a variable nozzle turbine assembly where, for example, a controller is operatively coupled to the variable nozzle turbine assembly and where, for example, the controller may operate to simultaneously transition a valve to an open state for purposes of diverting at least a portion of exhaust to a treatment unit and to transition the variable nozzle turbine assembly to a closed state. In such an example, in the closed state of the variable nozzle turbine assembly, flow may be restricted from a volute to a turbine wheel space, which may thereby help to promote flow to a diversion passage and to a treatment unit.

As an example, a turbine housing assembly may include a spring that operates to help maintain a valve in a closed state.

As an example, a treatment unit may include one or more catalysts. In such an example, catalyst operation may be temperature dependent where, for example, catalyst may operate more effectively at higher temperatures (e.g., temperatures above ambient, etc. (e.g., consider above 30 degrees C.)).

As an example, a controller may operate according to a temperature measurement. As an example, a turbine housing assembly may include one or more temperature sensors (e.g., to measure ambient and/or other temperature(s)).

As an example, a turbine housing assembly may include a wastegate. In such an example, a controller may control operation of the wastegate and, for example, also control operation of a valve that can direct exhaust flow to a treatment unit, which may include one or more catalysts.

As an example, a method can include issuing a signal to transition a valve of a turbocharger turbine assembly from a closed state to an open state responsive to detection of a cold-start condition of an internal combustion engine; responsive to the signal, moving a plug of a valve into an inlet passage of the turbocharger turbine assembly to restrict flow to a volute in fluid communication with the inlet passage and to direct flow to a diversion passage in fluid communication with a treatment unit; and heating the treatment unit to improve its operational efficiency. In such an example, the method may further include, responsive to the detection of the cold-start condition, issuing another signal and, responsive to the another signal, transitioning a variable nozzle turbine assembly of the turbocharger turbine assembly to a closed state to restrict flow to a turbine wheel space.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

CLAIMS

What is claimed is:

1. A turbine housing assembly comprising:
an inlet conduit portion of a turbine housing that defines an inlet passage having an inlet opening, wherein the inlet conduit portion comprises a bore, a cavity, and a valve seat, wherein the inlet passage is in fluid communication with the cavity via an opening surrounded by the valve seat;
a volute portion of the turbine housing that defines a volute that is in fluid communication with the inlet passage and a turbine wheel space for a turbine wheel;
a valve that comprises a control arm and a shaft coupled to an arm coupled to a plug, wherein the plug is disposed at least partially within the inlet passage when in the open state, the shaft is rotatably supported by a bushing disposed in the bore and wherein, in a closed state of the valve, the arm is disposed in the cavity; and
a controller operatively coupled to the control arm to transition the valve between the closed state and an open state,
wherein, in the open state, the plug moves into the inlet passage to restrict flow between the inlet opening and the volute, and to divert at least a portion of the exhaust flow into the cavity,
wherein the cavity is in direct fluid communication with a treatment unit such that the diverted portion of the exhaust flow does not merge with exhaust flow passing through the turbine wheel space before entry into the treatment unit.

2. The turbine housing assembly of claim 1, wherein the plug comprises a planar valve seat side and a contoured inlet passage side.

3. The turbine housing assembly of claim 1, further comprising a dedicated diversion passage in fluid communication with the cavity, wherein the diversion passage bypasses the volute and turbine wheel space and leads directly to the treatment unit.

4. The turbine housing assembly of claim 1, wherein the treatment unit comprises one or more catalysts.

5. The turbine housing assembly of claim 1, wherein the controller is configured to actuate the valve to divert exhaust flow to the treatment unit during a cold-start condition.

6. The turbine housing assembly of claim 1, wherein the arm and the plug are formed as a single monoblock component.

7. The turbine housing assembly of claim 1, wherein the plug, when in the open state, is positioned within the inlet passage such that exhaust flow impinges upon a front surface of the plug and is deflected into the cavity.

8. The turbine housing assembly of claim 1, wherein the cavity is fluidly isolated from the turbine wheel space.

9. The turbine housing assembly of claim 1, further comprising a spring that is disposed between the control arm and a stationary portion of the turbine housing, the spring being configured to bias the valve toward the closed state to seal the cavity from the inlet passage during normal operation.

10. The turbine housing assembly of claim 9, wherein the spring is further configured to damp vibration or oscillation of the valve during operation.

11. The turbine housing assembly of claim 1, further comprising a wastegate.

12. The turbine housing assembly of claim 11, wherein the controller controls operation of the wastegate.

13. The turbine housing assembly of claim 1, wherein the controller operates according to a temperature measurement.

14. The turbine housing assembly of claim 13, further comprising one or more temperature sensors.

15. The turbine housing assembly of claim 13, wherein the controller is configured to transition the valve to the open state when the measured temperature is below a catalyst light-off threshold.

16. The turbine housing assembly of claim 1, further comprising a variable nozzle turbine assembly.

17. The turbine housing assembly of claim 16, wherein the controller is operatively coupled to the variable nozzle turbine assembly.

18. The turbine housing assembly of claim 17, wherein the controller operates to simultaneously transition the valve to the open state and to transition the variable nozzle turbine assembly to a closed state.

19. The turbine housing assembly of claim 18, wherein, in the closed state of the variable nozzle turbine assembly, flow is restricted from the volute to the turbine wheel space.

\* \* \* \* \*